(12) United States Patent
Aaron et al.

(10) Patent No.: US 8,219,568 B2
(45) Date of Patent: Jul. 10, 2012

(54) PROVIDING EXTENSIBLE DOCUMENT ACCESS TO ASSISTIVE TECHNOLOGY PROVIDERS

(75) Inventors: Joseph D. Aaron, Jonestown, TX (US); Samuel R. Detweiler, Cedar Park, TX (US); Catherine K. Laws, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/059,722

(22) Filed: Mar. 31, 2008

(65) Prior Publication Data

US 2008/0177715 A1 Jul. 24, 2008

Related U.S. Application Data

(63) Continuation of application No. 11/260,572, filed on Oct. 27, 2005, now abandoned.

(51) Int. Cl.
*G06F 17/30* (2006.01)
*G06F 3/00* (2006.01)

(52) U.S. Cl. ........................................ 707/756; 715/729

(58) Field of Classification Search .................. 434/114; 704/1, 200; 707/705, 999.002, 999.003, 707/999.01, 754–756; 715/729
See application file for complete search history.

(56) References Cited

U.S. PATENT DOCUMENTS

| | | | |
|---|---|---|---|
| 6,690,365 B2 * | 2/2004 | Hinckley et al. | 715/973 |
| 7,318,198 B2 * | 1/2008 | Sakayori et al. | 715/729 |
| 2002/0109704 A1 | 8/2002 | Rajarajan et al. | |
| 2004/0127284 A1 * | 7/2004 | Walker et al. | 463/30 |
| 2005/0042581 A1 | 2/2005 | Oh et al. | |
| 2005/0233287 A1 * | 10/2005 | Bulatov et al. | 434/114 |
| 2006/0036612 A1 | 2/2006 | Harrop et al. | |
| 2007/0055938 A1 * | 3/2007 | Herring et al. | 715/729 |
| 2007/0226613 A1 | 9/2007 | Tandoriono et al. | |

OTHER PUBLICATIONS

US Patent and Trademark Office Action dated May 28, 2008 in U.S. Appl. No. 11/260,572.

* cited by examiner

*Primary Examiner* — Marc Filipczyk
(74) *Attorney, Agent, or Firm* — Yudell Isidore Ng Russell PLLC

(57) ABSTRACT

A system and computer program product provides an intermediary access engine between a specific document and a renderer for assisting individuals with vision impairment. The access engine is instantly activated responsive to the initiation of an event within an application. In response to instantiation of the access engine, the renderer queries the access engine to determine supported navigation modes for serving the document to the individual. The access engine receives navigation and commands from the renderer and sends rendering information for the current focus within the document to the renderer. The renderer uses the received information to render an output via one or more enhanced capabilities of the renderer. The rendered output may then be utilized by individuals with vision impairment. The output, for example, may be a speech output, brail output, or font enlargement output for application data.

11 Claims, 3 Drawing Sheets

PROVIDING EXTENSIBLE DOCUMENT ACCESS TO ASSISTIVE TECHNOLOGY PROVIDERS

CROSS-REFERENCE TO RELATED APPLICATION

This is a continuation of application Ser. No. 11/260,572, filed Oct. 27, 2005, and titled A Method and Apparatus for Providing Extensible Document Access to Assistive Technology Providers, now abandoned.

BACKGROUND

1. Technical Field of the Present Invention

The present invention generally relates to computers, and more specifically, to intermediate software that provides an interface between applications and assistive software that assists an individual with vision impairment.

2. Description of Related Art

Technological advances have allowed the electronic industry to take a more active and, often times, critical role in assisting individuals with various disabilities. In particular, these advances have enhanced the number of options in which information can be presented to an individual.

Personal computers are examples of the type of technology that have been adapted to assist individuals with vision impairment. In general, visual information is displayed on a monitor and data can be added or manipulated via keystrokes upon an associated keyboard. Screen readers or renderers (e.g. JAWS™ by Freedom Scientific) have enabled visually impaired individuals to hear what is being displayed on the monitor via a speech synthesizer and/or felt on a refreshable Braille display.

The renderers can support applications such as the Internet Explorer with special features, such as, links lists, frame lists, forms mode and reading of HTML labels and graphic labels included on web pages. Upon entering an HTML document via an Internet link, the speech synthesizer will speak the number of frames in a document being read in Internet Explorer and the number of links in the frame currently being displayed. The speech synthesizer will also read graphics labeled by alternate tags in HTML code.

In order to provide the appropriate assistance, the renderer must have knowledge concerning each document type that is to be rendered (e.g. navigation, display properties etc.). Unfortunately, each document type has its own set of objects and attributes that are described in its Document Object Model (DOM) such as HTML, XHTML, PDF, Flash, and Daisy. Some of these DOMs will have proprietary protection schemes to ensure that the document content is used in accordance with its license (e.g., password protection scheme). As a result of the definition of DOMs becoming more document specific, the complexity of attempting to interface with DOMs has increased. For example, a chart is different than a paragraph and a table is different than a graphics image. Some objects are completely enclosed in their own renderer and appear as a hole (e.g. an embedded object) in the main document.

As the types of complex documents increase, the above noted issues and others will continue to arise, and the ability of renderers to continue to provide the same functionality as the displayed information is becoming increasingly difficult. More specifically, the application developers must have detailed knowledge of the semantics of each document type and how to access each renderer's proprietary access methods (e.g., programming interfaces). Unfortunately, this information is not readily available, and often times, limited to a specific group of individuals.

It would, therefore, be a distinct advantage to provide an interface that would provide application developers with the ability to interact with these DOMs without having detailed knowledge of the DOMs themselves.

SUMMARY OF THE PRESENT INVENTION

In one aspect, the present invention is a method of rendering document objects to individuals with vision impairment. The method includes the step of creating an access engine. The method also includes the step of transmitting navigation commands to the access engine during the navigation of a document object. The method further includes receiving information related to the document object from the access engine in response to the transmitted navigation commands. The method then renders the received information.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method, system, and computer program product for assisting individuals with vision impairment. More specifically, the present invention provides an access engine that intermediates between the renderer and the specific document (DOM). The access engine provides a convenient and specific location from which the DOM can publish the Application Specific Interface (API) calls, methods, procedures, and a list of supported events that can be processed by the DOM. Any software that is required to interface with the specific content DOMs can use the access engine.

Figure 1:
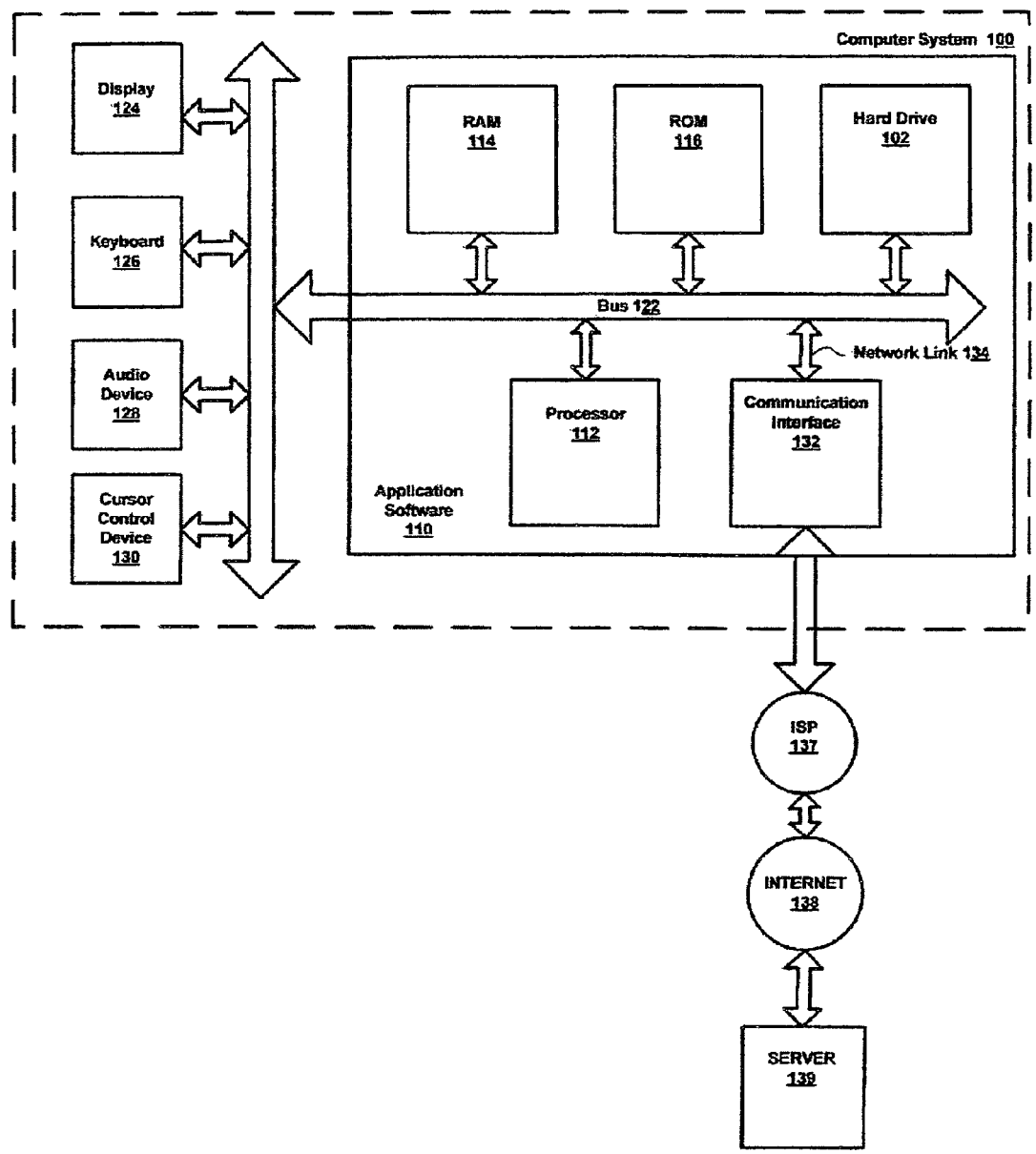
FIG. 1 is a block diagram illustrating a computer system that implements a preferred embodiment of the present invention.

Reference now being made to FIG. 1, a block diagram is shown illustrating a computer system 100 that implements a preferred embodiment of the present invention. Computer System 100 includes various components each of which is explained in greater detail below.

Bus 122 represents any type of device capable of providing communication of information within Computer System 100 (e.g., System bus, PCI bus, cross-bar switch, etc.)

Processor 112 can be a general-purpose processor (e.g., the PowerPC™ manufactured by IBM or the Pentium™ manufactured by Intel) that, during normal operation, processes data under the control of an operating system and application software 110 stored in a dynamic storage device such as Random Access Memory (RAM) 114 and a static storage device such as Read Only Memory (ROM) 116. The operating system preferably provides a graphical user interface (GUI) to the user.

The present invention, including the alternative preferred embodiments, can be provided as a computer program product, included on a machine-readable medium having stored on it machine executable instructions used to program computer system 100 to perform a process according to the teachings of the present invention.

The term "machine-readable medium" as used in the specification includes any medium that participates in providing instructions to processor 112 or other components of computer system 100 for execution. Such a medium can take many forms including, but not limited to, non-volatile media, and transmission media. Common forms of non-volatile media include, for example, a floppy disk, a flexible disk, a hard disk, magnetic tape, or any other magnetic medium, a Compact Disk ROM (CD-ROM), a Digital Video Disk-ROM (DVD-ROM) or any other optical medium whether static or rewriteable (e.g., CDRW and DVD RW), punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the preferred embodiment, an example of a non-volatile medium is the Hard Drive 102.

Volatile media includes dynamic memory such as RAM 114. Transmission media includes coaxial cables, copper wire or fiber optics, including the wires that comprise the bus 122. Transmission media can also take the form of acoustic or light waves, such as those generated during radio wave or infrared data communications.

Moreover, the present invention can be downloaded as a computer program product where the program instructions can be transferred from a remote computer such as server 139 to requesting computer system 100 by way of data signals embodied in a carrier wave or other propagation medium via network link 134 (e.g., a modem or network connection) to a communications interface 132 coupled to bus 122.

Communications interface 132 provides a two-way data communications coupling to network link 134 that can be connected, for example, to a Local Area Network (LAN), Wide Area Network (WAN), or as shown, directly to an Internet Service Provider (ISP) 137. In particular, network link 134 may provide wired and/or wireless network communications to one or more networks.

ISP 137 in turn provides data communication services through the Internet 138 or other network. Internet 138 may refer to the worldwide collection of networks and gateways that use a particular protocol, such as Transmission Control Protocol (TCP) and Internet Protocol (IP), to communicate with one another. ISP 137 and Internet 138 both use electrical, electromagnetic, or optical signals that carry digital or analog data streams. The signals through the various networks and the signals on network link 134 and through communication interface 132, which carry the digital or analog data to and from computer system 100, are exemplary forms of carrier waves transporting the information.

In addition, multiple peripheral components can be added to computer system 100. For example, audio device 128 is attached to bus 122 for controlling audio output. A display 124 is also attached to bus 122 for providing visual, tactile or other graphical representation formats. Display 124 can include both non-transparent surfaces, such as monitors, and transparent surfaces, such as headset sunglasses or vehicle windshield displays.

A keyboard 126 and cursor control device 130, such as mouse, trackball, or cursor direction keys, are coupled to bus 122 as interfaces for user inputs to computer system 100.

The execution of application software 110 on computer system 100 according to a preferred embodiment of the present invention is explained in greater detail below.

Figure 2:
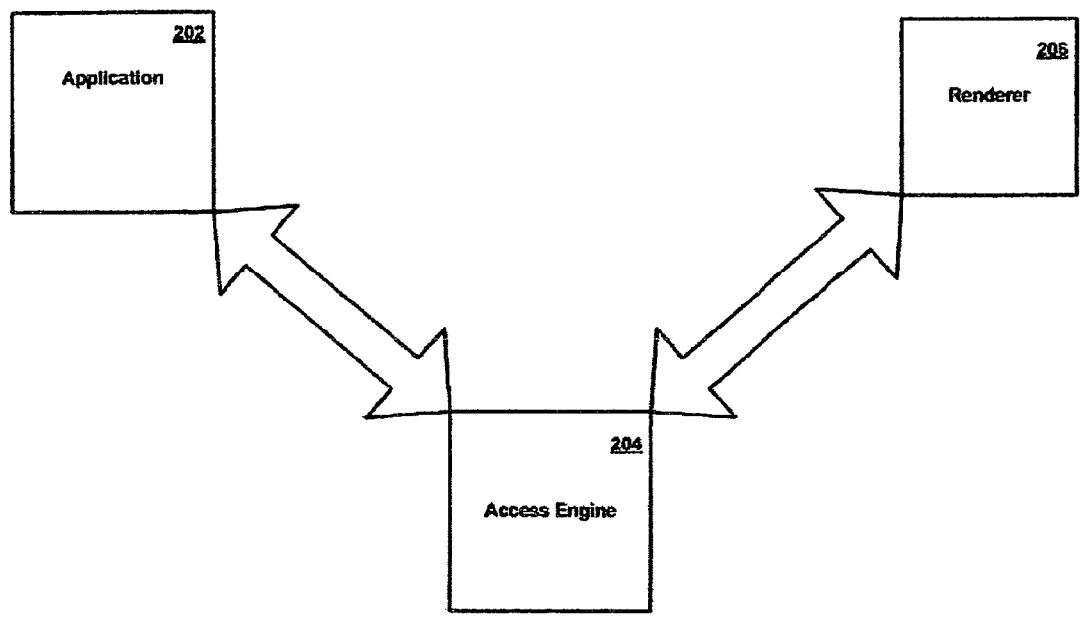
FIG. 2 is a data diagram illustrating the interactions between a DOM, a Renderer, and an Access Engine according to the teachings of the present invention.

Reference now being made to FIG. 2 a data diagram is shown illustrating the interactions between an application 202 having a specified format such as DOM, a Renderer 206, and an Access Engine 204 according to the teachings of the present invention. The application 202 can represent an HTML document such as a web page, and the renderer 206 can be, for example, the JAWS™ renderer by Freedom Scientific.

In the preferred embodiment of the present invention, an access engine 204 is created that provides a convenient, consistent and knowledgeable interface between the renderer 206 and the application 202. The access engine 204 provides information about the types of objects supported, and information concerning the rendering of each supported object such as supported navigation modes, displayed information, event handling and the like.

The renderer 206 and access engine 204 communicate with one another using external configuration information such as data type mappings or configuration file settings.

An example of how the Access Engine can be implemented as a class instantiation is provided below in pseudo code.

```
Public class AccessEngine( ){
    Void AccessEngine( ){ };
    //return supported reading modes
    // character, word, line, sentence, paragraph, page, image, etc
    public List get Modes( );
    //get a list of movement increments
    // previous/current/next, each object type
    public List getMovementIncrements( );
    //return pointer to next object in the direction specified
    //type = char, word, line, page, start, end, etc
    public ObjectgetObject(Movement direction type); //direction =
        previous,
current or next
}
```

The pseudo code provided above is merely representative of how the access engine 204 can be implemented and is not to be considered a limitation on its applicability to other implementations or the functionality described herein.

In the preferred embodiment of the present invention, the application 202 would have methods for extracting object information and states as noted below in exemplary pseudo code.

```
{
    //get text to speak
    public String getText( );
    //get state to speak
    public String getState( ); //like checked or not checked
    // get the input/output mode
    public String getMode( );
    //etc.
}
```

Figure 3:
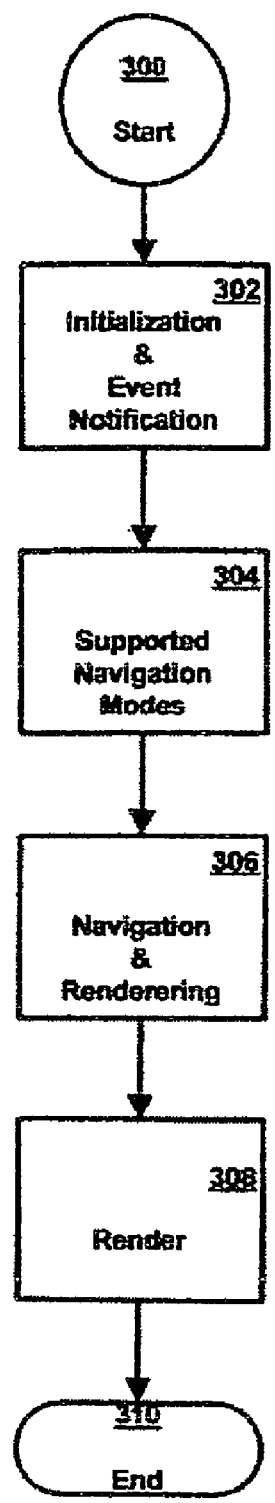
FIG. 3 is a flow chart illustrating the method for using the access engine of FIG. 2 according to the teachings of the present invention.

Reference now being made to FIG. 3, a flow chart is shown illustrating the method for using the access engine of FIG. 2 according to the teachings of the present invention. The method begins upon the instantiation of the access engine 204. The instantiation can be the result of the initiation of a document process and/or an event such as changing focus or indication that a new user interface object is being presented to the end user (Steps 300-302). For multi-document renderers, such as the Home Page Reader™ by IBM, the access engine 204 can be instantiated upon the loading of a new document.

Upon instantiation and a predetermined event, the renderer 206 queries the access engine 204 to determine the navigation modes supported for the application 202 and provides the renderer with choices that can be user selectable (e.g. word, sentence, line, paragraph, etc.) (Step 304).

During the navigation of the application 202, the renderer 206 sends navigation and possibly other commands (e.g. input) to the access engine 204 and receives rendering information for the current focus object, or as the case may be, the next object to receive focus. For example, the navigation command could be 'next object' or 'next page'. The access engine 204 and application 202 focus would advance to the next supported object (e.g. chart in a drawing application) using a navigation mode. In addition, the access engine 204 accesses the application 202 to query and extract attributes about the next object for presentation such as content, descriptive text, state, value, and supported actions (e.g. press enter to activate a link).

Thus, the document provider dynamically enhances the capabilities of the renderers by supplying extended functions to supply the new attributes for new document object types. This provides the renderer 206 with the ability to dynamically adjust to the application 202 content semantics. (Step 306).

The renderer 206 uses the information provided by the access engine 204 to provide rendering such as speech output, brail, font enlargement and the like (Step 308).

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A computer system comprising:
a processor; and
a memory coupled to said processor, wherein said memory includes:
an application that executes on the processor;
a renderer that executes on the processor; and
an access engine for publishing Application Specific Interface (API) calls, methods, procedures, and events of the application that executes on the processor, wherein the access engine intermediates interactions between the renderer and the application, and wherein the access engine:
provides, to the renderer, one or more types of objects supported by the application and render information for the supported types of objects;
receives, from the renderer, a navigation command for navigation from a first document object to a second document object by the application; and
in response to receiving the navigation command:
queries the application for one or more attributes of the second document object that are utilized for presenting the second document object, wherein the second document object is one of the one or more types of objects supported by the application, identifies one or more extended functions that are utilized to supply the one or more attributes, and
sends, to the renderer, the one or more attributes and the one or more extended functions, wherein the renderer, in response to receiving the document object:
renders the second document object by applying the one or more extended functions to the one or more attributes of the second document object, and
presents the rendered object in one selected from a group consisting of an audible format and a Braille format,
wherein the one or more extended functions enhance the functionality of the renderer to support the document object type of the second document object, and
wherein the access engine is instantiated in response to one selected from a group consisting of a predetermined event and a new process beginning.

2. The computer system of claim 1, wherein the access engine queries the application for supported navigation actions of the second document object.

3. The computer system of claim 1, wherein the access engine queries the application for supported navigation modes of the second document object.

4. The computer system of claim 1, wherein the second document object is a new document object to the renderer.

5. The computer system of claim 1, wherein the navigation command is an input command.

6. The computer system of claim 1, wherein the one or more attributes include one or more of:
descriptive text content;
state content;
value content; and
supported actions.

7. A computer program product comprising a machine-readable storage medium having executable instructions embodied therein that when executed by a processor within a computer system provide a plurality of functions for rendering document objects to individuals with vision impairment, the plurality of functions comprising:
instantiating an access engine within the memory of the computer system for publishing Application Specific Interface (API) calls, methods, procedures, and events of an application executing on the computer system, wherein the access engine intermediates interactions between a renderer executing on the computer system and the application, the access engine:
providing, to the renderer, one or more types of objects supported by the application and rendering information for the supported types of objects;
receiving, from the renderer, a navigation command for navigation from a first document object to a second document object by the application;
in response to receiving the navigation command:
querying the application for one or more attributes of the second document object that are utilized for presenting the second document object, wherein the second document object is one of the one or more types of objects supported by the application,
identifying one or more extended functions that are utilized to supply the one or more attributes, and
sending, to the renderer, the one or more attributes and the one or more extended functions, wherein the renderer, in response to receiving the document object:
renders the second document object by applying the one or more extended functions to the one or more attributes of the second document object, and presents the rendered object in one selected from a group consisting of an audible format and a Braille format, wherein the one or more extended functions enhance the functionality of the renderer to support the document object type of the second document object, and wherein the access engine is instantiated in response to one selected from a group consisting of a predetermined event and a new process beginning.

8. The computer program product of claim 7, further comprising the access engine:

querying the application for supported navigation actions of the second document object.

9. The computer program product of claim 7, wherein the second document object is a new document object to the renderer.

10. The computer program product of claim 7, wherein the navigation command is an input command.

11. The computer program product of claim 7, wherein the one or more attributes include one or more of:

descriptive text content;

state content;

value content; and supported actions.

* * * * *